US012747777B2

(12) United States Patent
Faggiani et al.

(10) Patent No.: US 12,747,777 B2
(45) Date of Patent: Sep. 29, 2026

(54) SYSTEM AND METHOD FOR DETECTING RELATIVE ANGULAR POSITIONS OF DOG CLUTCH ELEMENTS

(71) Applicant: DANA ITALIA S.R.L., Arco (IT)

(72) Inventors: Giacomo Faggiani, Rovereto (IT); Pier Paolo Rinaldi, Arco (IT); Mark Slater, Warwickshire (GB); Richard Taylor, Warwickshire (GB)

(73) Assignee: DANA ITALIA S.R.L., Trentino (IT)

( * ) Notice: Subject to any disclaimer, the term of this patent is extended or adjusted under 35 U.S.C. 154(b) by 76 days.

(21) Appl. No.: 18/431,247

(22) Filed: Feb. 2, 2024

(65) Prior Publication Data

US 2025/0251032 A1 Aug. 7, 2025

(51) Int. Cl.

| | |
|---|---|
| ***F16H 3/00*** | (2006.01) |
| ***F16H 3/12*** | (2006.01) |
| ***F16H 61/688*** | (2006.01) |

(52) U.S. Cl.
CPC ............ *F16H 3/006* (2013.01); *F16H 3/126* (2013.01); *F16H 61/688* (2013.01); *F16H 2306/48* (2013.01); *F16H 2306/50* (2013.01)

(58) Field of Classification Search
CPC ........ F16H 3/006; F16H 3/126; F16H 61/688; F16H 2306/48; F16H 2306/50
See application file for complete search history.

(56) References Cited

U.S. PATENT DOCUMENTS

| | | | |
|---|---|---|---|
| 7,197,391 B2 | 3/2007 | Kunibe et al. | |
| 7,216,030 B2 | 5/2007 | Kassner | |
| 7,310,574 B2 | 12/2007 | Di Cola et al. | |
| 10,473,542 B2 | 11/2019 | Hawarden et al. | |
| 2023/0108291 A1 * | 4/2023 | Piracha .................. | F16D 48/06 701/67 |

OTHER PUBLICATIONS

Piracha, M. et al., "Model Based Control of Synchronizers for Reducing Impacts during Sleeve to Gear Engagement," SAE International Technical Paper, 2019-01-1303, Apr. 2, 2019, 14 pages.

* cited by examiner

*Primary Examiner* — Victor L MacArthur
(74) *Attorney, Agent, or Firm* — McCoy Russell LLP

(57) ABSTRACT

Methods and systems for shifting a multi-gear step ratio transmission that includes a dog clutch are described. In one example, rotational positions of different transmission components are measured by tone wheels and a shifter actuator position is adjusted in response to a phase angle difference between the rotational positions of the different transmission components.

10 Claims, 9 Drawing Sheets

SYSTEM AND METHOD FOR DETECTING RELATIVE ANGULAR POSITIONS OF DOG CLUTCH ELEMENTS

TECHNICAL FIELD

The present disclosure relates to smoothly closing a dog clutch of a transmission.

BACKGROUND AND SUMMARY

A transmission may allow a propulsion source to operate a vehicle at speeds and loads that may be unattainable if the propulsion source were coupled to vehicle wheels without the transmission. The transmission may enable the vehicle to operate over a wider range of speeds and load by providing multiple gear ratios between the propulsion source and vehicle wheels. A dog clutch may be applied to engage and disengage transmission gears for transmissions that may be subject to higher loads. The dog clutch may provide efficient transfer of torque and the dog clutch may exhibit less wear than a friction clutch. However, closing the dog clutch may cause shift shock, noise, and/or a driveline torque disturbance if engagement of the dog clutch is not smooth. One way to provide a smoother shift may include synchronizing a rotational speed of one half of a dog clutch to a rotational speed of a second half of the dog clutch. Yet, even with speed synchronization, it may be possible for a gear shift to be less than smooth.

The inventors herein have recognized the above-mentioned issues and have developed an electric propulsion system, comprising: an electric machine; a step gear ratio transmission including at least two gear ratios, the step gear ratio transmission including a shifter actuator; and one or more controllers including executable instructions that cause the one or more controllers to command the shifter actuator to engage a dog clutch in response to a phase angle being between two angles.

By commanding a shifter actuator to move to an engaged position in response to a phase angle between two rotating transmission components, it may be possible to provide the technical result of less interference between teeth of a dog clutch so that teeth of one half or side of the dog clutch mesh smoothly with teeth of a second half or side of the dog clutch. Consequently, a possibility of shifting noise and wear may be reduced.

The present description may provide several advantages. In particular, the approach may reduce a possibility of shift shock by providing higher accuracy dog clutch position estimates. Further, the approach may reduce a possibility of dog clutch tooth wear. Additionally, the approach applies direct measurements of rotating devices that are engaged so that errors due to gear backlash may be reduced, thereby improving gear shifting quality.

It is to be understood that the summary above is provided to introduce in simplified form a selection of concepts that are further described in the detailed description. It is not meant to identify key features of the claimed subject matter, the scope of which is defined uniquely by the claims that follow the detailed description. Furthermore, the claimed subject matter is not restricted to implementations that solve any disadvantages noted above or in any part of this disclosure.

DETAILED DESCRIPTION

Figure 1:
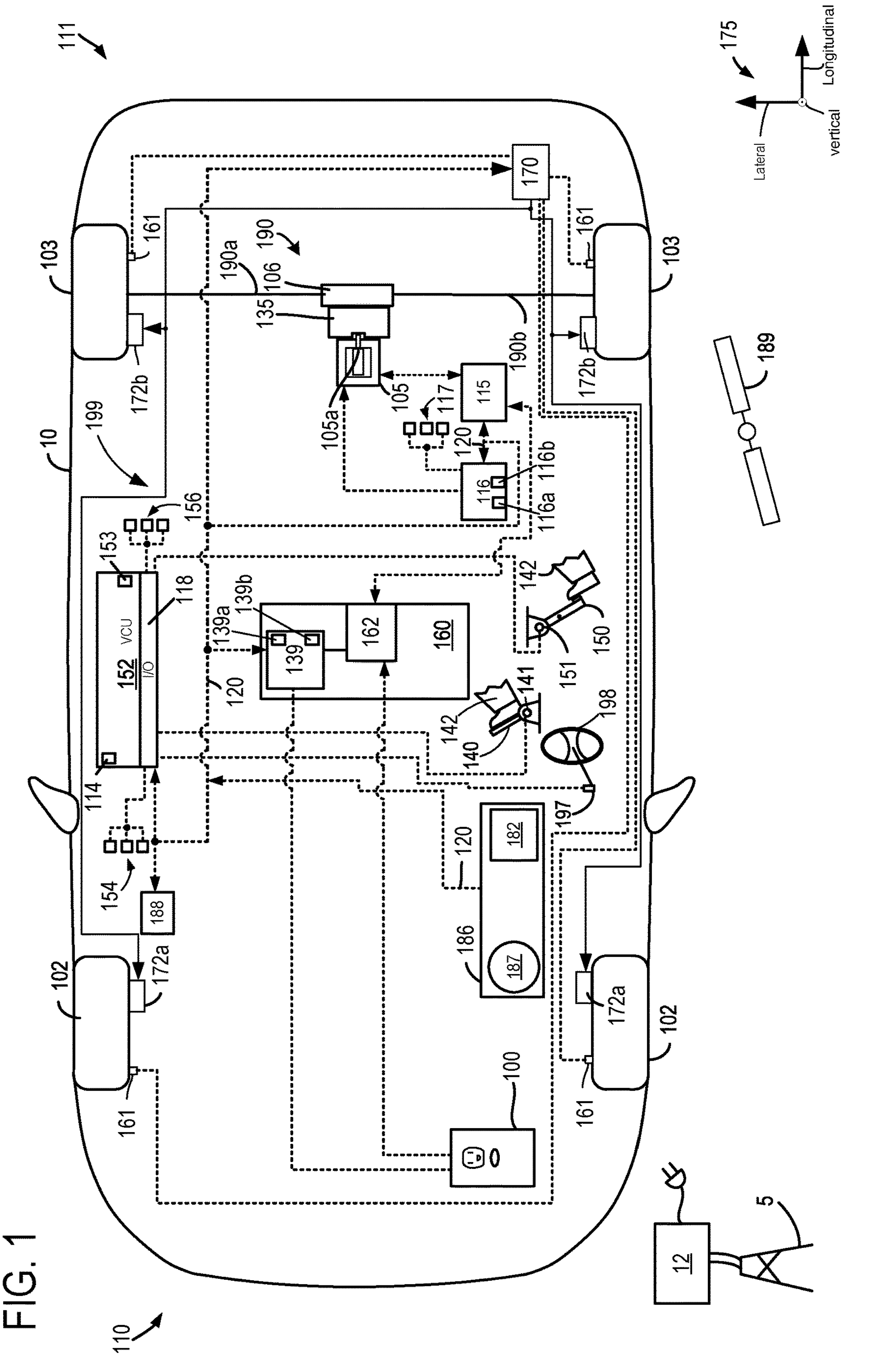
FIG. 1 is an illustration of an example vehicle that includes an electric vehicle propulsion system.
Figure 2:
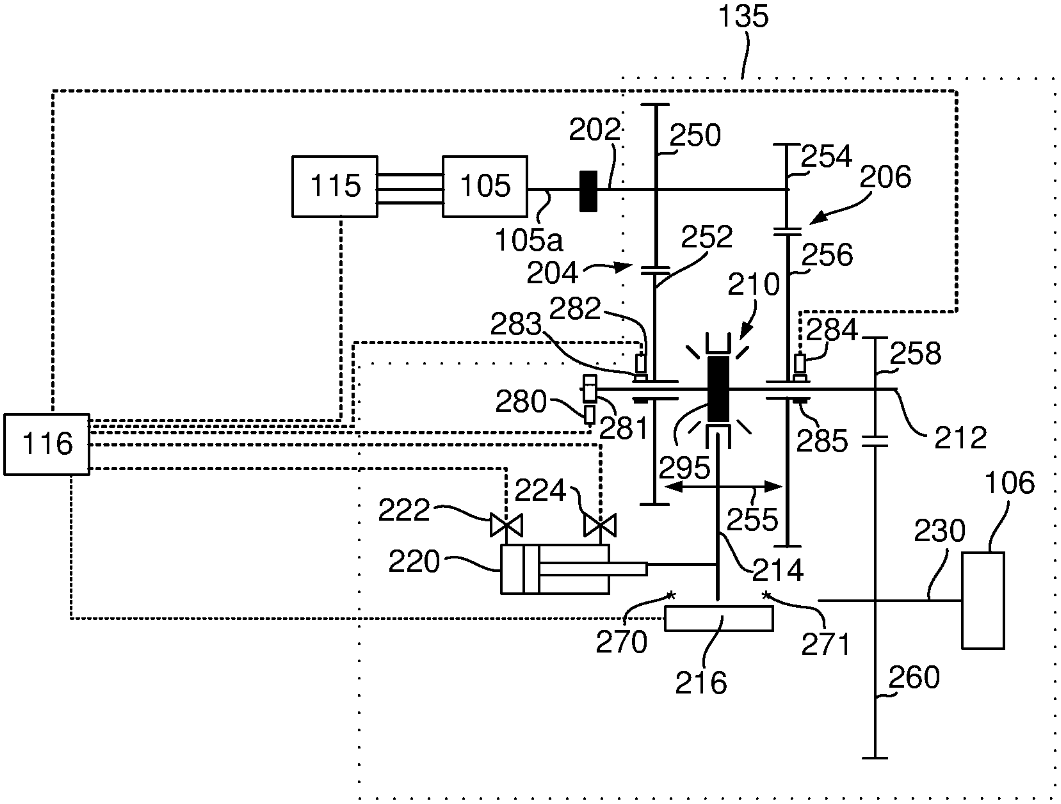
FIG. 2 shows a stick diagram of one example step gear ratio transmission configuration.
Figure 6:
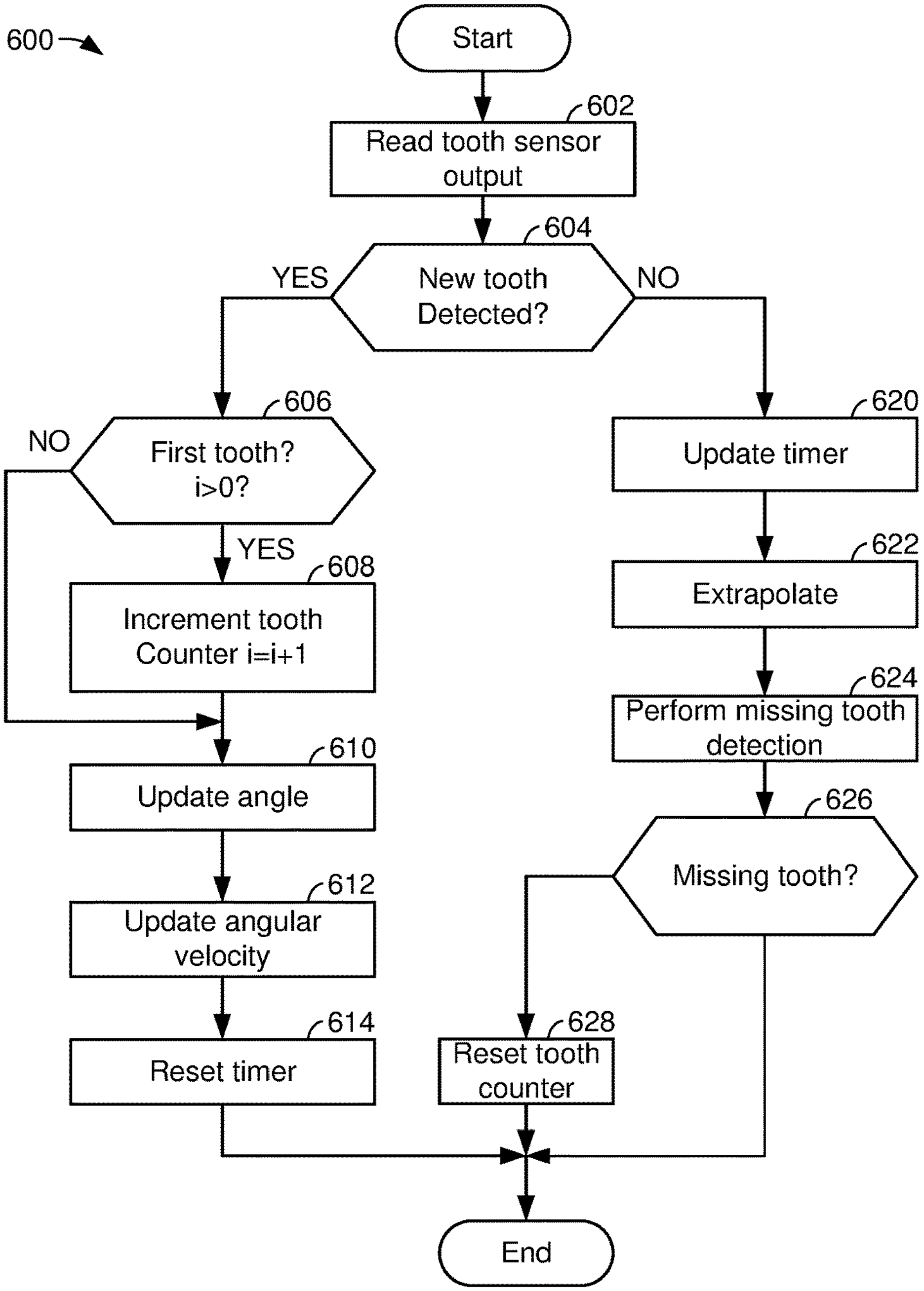
FIG. 6 shows a flow chart of an example method for determining angular positions of tone wheels of a transmission.
Figure 7:
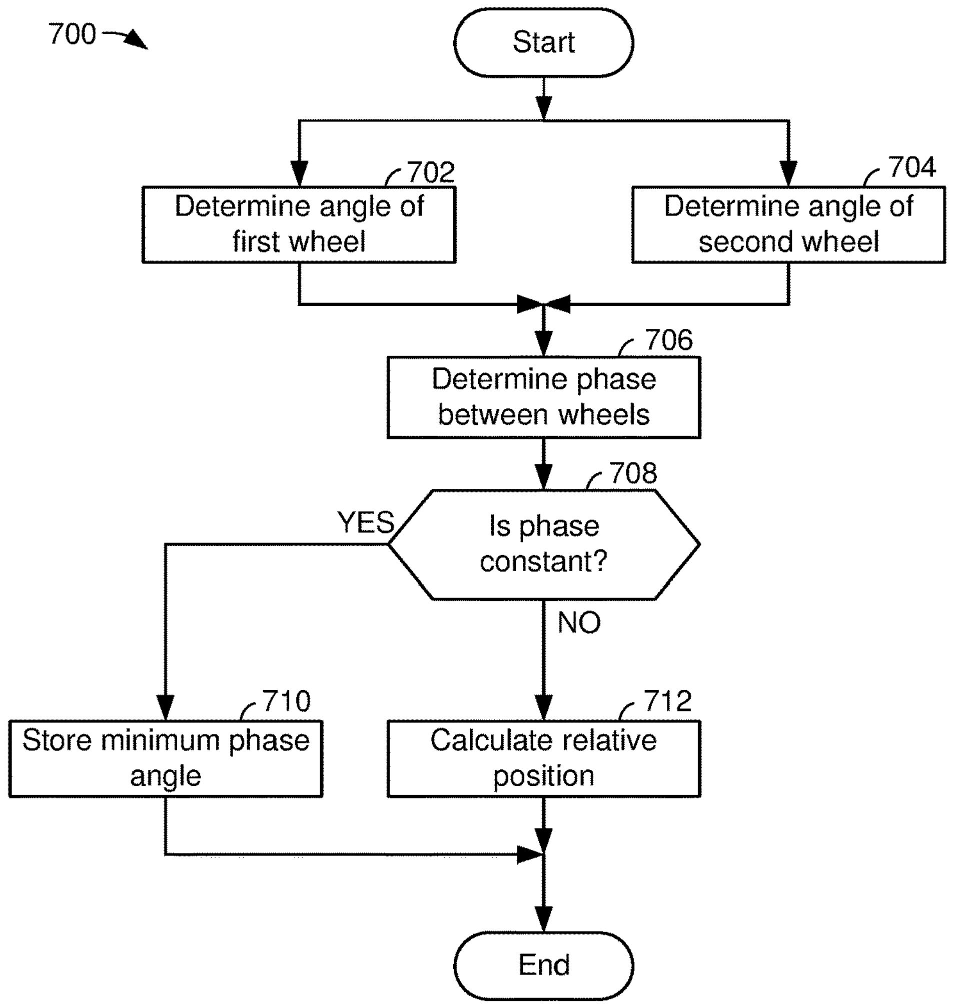
FIG. 7 shows a flow chart of an example method for determining a phase angle between tone wheel angular positions and dog clutch engagement.
Figure 8:
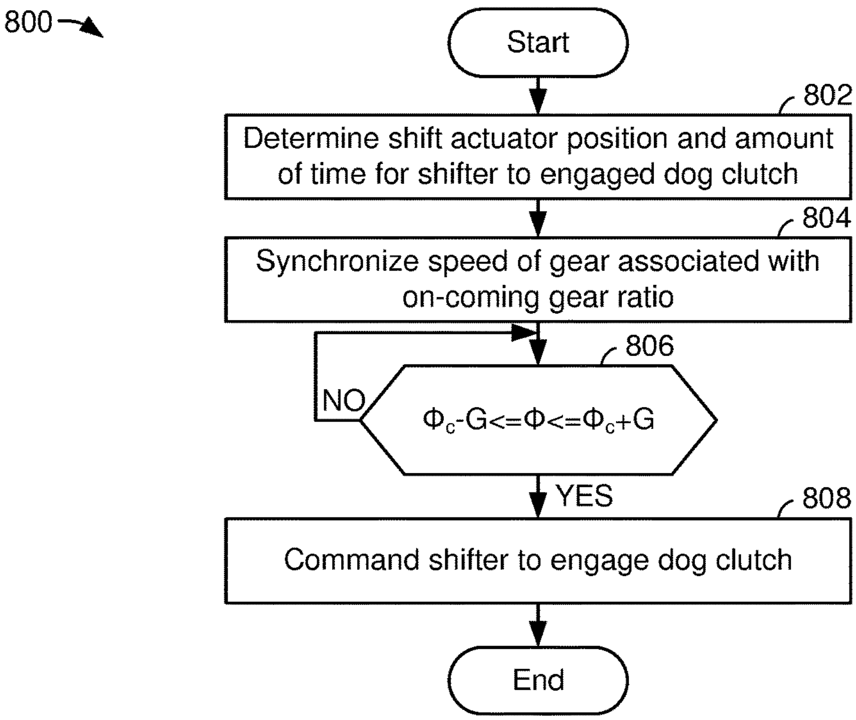
FIG. 8 shows a method for commanding a gear shifter according to a phase angle difference between two halves of a driveline disconnect clutch.
Figure 9:
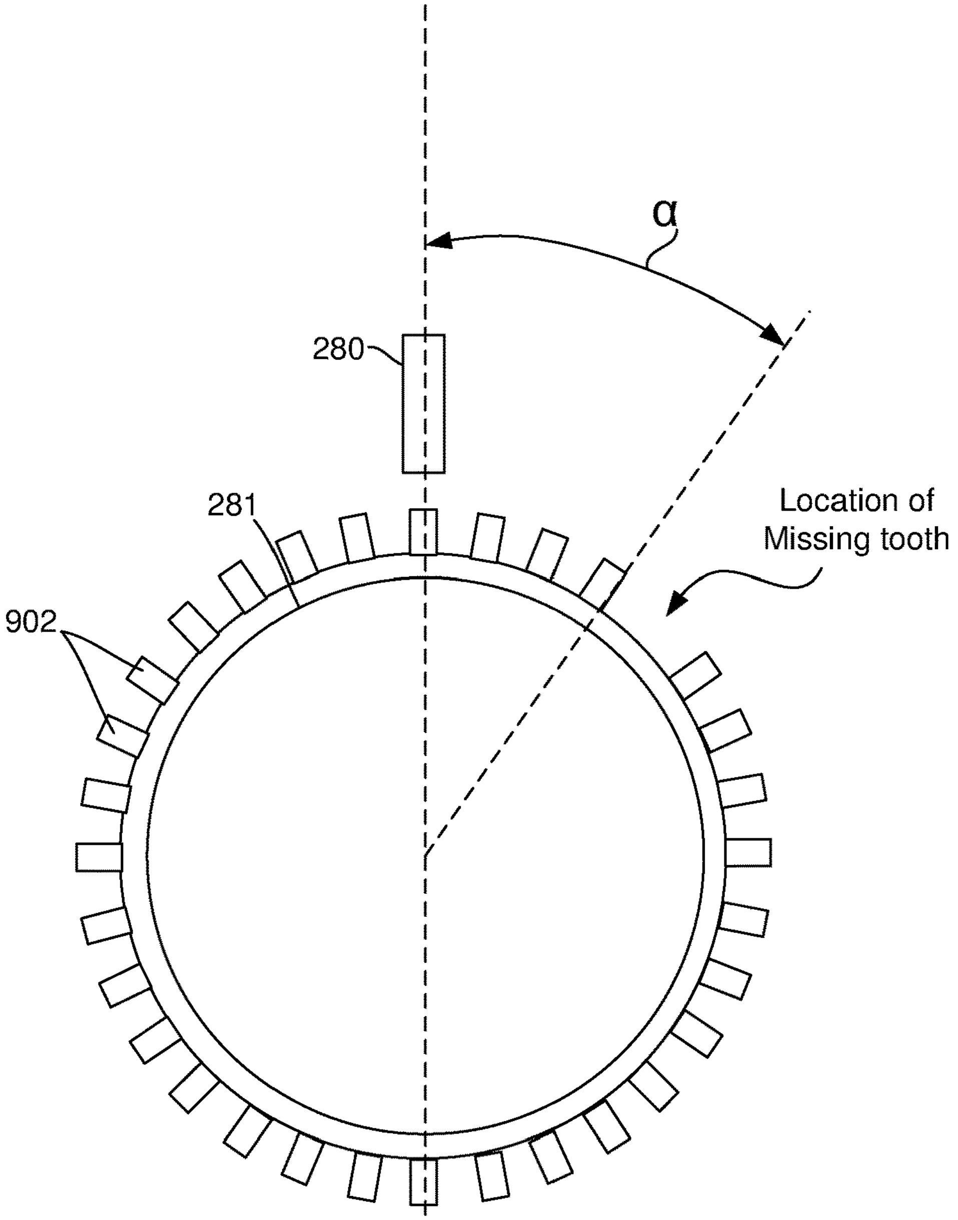
FIG. 9 shows an example tone wheel and tone wheel sensor.

A method and system for controlling engagement of a dog clutch during shifting of a transmission is described. The transmission may be a two speed transmission (e.g., a transmission with two forward gear ratios) or a transmission having more than two gear ratios. The transmission shifting may include determining angles of two rotating transmission components so that a dog clutch may be engaged smoothly. Additionally, a phase difference between two halves of the dog clutch may be determined so as to aid in clutch engagement. The dog clutch may be applied in an electric vehicle as shown in FIG. 1, or alternatively, in a hybrid or internal combustion engine propelled vehicle. In one example, the transmission may be a two speed transmission as shown in FIG. 2. The transmission may have a dog clutch with components as shown in FIGS. 3A-5. A method for determining angles of dog clutch halves is shown in FIG. 6. A method for determining a phase difference between two halves of a dog clutch is shown in FIG. 7. The phase difference may be applied to determine when to command a gear shifter to engage a dog clutch as shown in FIG. 8. The phase difference may be determined via a tone wheel and tone wheel sensor as shown in FIG. 9.

FIG. 1 illustrates an example vehicle propulsion system 199 for vehicle 10. In FIG. 1 mechanical connections between the various components are illustrated as solid lines, whereas electrical connections between various components are illustrated as dashed lines. Vehicle front end is indicated at 110 and vehicle rear end is indicated at 111. Vehicle 10 travels in a forward direction when vehicle front end 110 leads movement of vehicle 10. Vehicle 10 travels in a reverse direction when vehicle rear end 111 leads movement of vehicle 10. In this example, vehicle 10 is a rear wheel drive vehicle, but in other examples, vehicle 10 may be a four-wheel drive or front wheel drive vehicle.

Vehicle propulsion system 199 includes a propulsion source 105 (e.g., an electric machine, such as a motor), but in other examples two or more propulsion sources may be provided. In one example, propulsion source 105 may be a synchronous or induction electric machine that may operate as a motor or generator. In other examples, propulsion source 105 may be a direct current (DC) machine. Vehicle propulsion system 199 also includes a transmission 135. The propulsion source 105 is fastened to the transmission 135 and propulsion source 105 delivers power from its rotor **105*a* to transmission 135. Transmission 135 may be mechanically coupled to differential gears. Differential gears 106 may be coupled to two axle shafts, including a first or right axle shaft 190***a* and a second or left axle shaft 190*b*. Vehicle 10 further includes front wheels 102 and rear wheels 103.

The transmission 135 may be referred to as a step ratio transmission and it may be configured as shown in greater detail in FIG. 2, or alternatively, a different configuration. Transmission 135 may include one or more clutch actuators (not shown) to shift one or more clutches. Electric power inverter 115 is electrically coupled to propulsion source 105 to convert DC power to alternating current (AC) and vise-versa. Powertrain controller 116 is electrically coupled to sensors 117 and actuators of vehicle propulsion system 199. For example, sensors 117 may include, but are not limited to inverter switch temperature sensors, electric machine winding temperature sensors, bus bar temperature sensors, etc.

Transmission 135 may transfer mechanical power to or receive mechanical power from differential gears 106. Differential gears 106 may transfer mechanical power to or receive mechanical power from rear wheels 103 via right axle shaft 190*a* and left axle shaft 190*b*. Propulsion source 105 may consume alternating current (AC) electrical power provided via electric power inverter 115. Alternatively, propulsion source 105 may provide AC electrical power to electric power inverter 115. Electric power inverter 115 may be provided with high voltage direct current (DC) power from battery 160 (e.g., a traction battery, which also may be referred to as an electric energy storage device or battery pack). Electric power inverter 115 may convert the DC electrical power from battery 160 into AC electrical power for propulsion source 105. Alternatively, electric power inverter 115 may be provided with AC power from propulsion source 105. Electric power inverter 115 may convert the AC electrical power from propulsion source 105 into DC power to store in battery 160.

Propulsion source 105 may transfer mechanical power to or receive mechanical power from transmission 135. As such, transmission 135 may be a multi-speed gear set that may shift between gear ratios when commanded via powertrain controller 116. Powertrain controller 116 includes a processor 116*a* and memory 116*b*. Memory 116*b* (e.g., storage media) may include read exclusive memory, random access memory, and keep alive memory. The memory may be programmed with computer readable data representing instructions that are executable by a processor for performing the methods and control techniques described herein as well as other variants that are anticipated but not specifically listed. As such, control techniques, methods, and the like expanded upon herein may be stored as instructions in non-transitory memory.

Battery 160 may periodically receive electrical energy from a power source such as a stationary power grid 5 residing external to the vehicle (e.g., not part of the vehicle). As a non-restricted example, vehicle propulsion system 199 may be configured as a plug-in electric vehicle (EV), whereby electrical energy may be supplied to battery 160 via the stationary power grid 5 and charging station 12. Electric charge may be delivered to battery 160 via plug receptacle 100.

Battery 160 may include a BMS controller 139 (e.g., a battery management system controller) and an electrical power distribution box 162. BMS controller 139 may provide charge balancing between energy storage elements (e.g., battery cells) and communication with other vehicle controllers (e.g., vehicle control unit 152). BMS controller 139 includes a core processor 139*a* and memory 139*b* (e.g., random-access memory, read-exclusive memory, and keep-alive memory).

Vehicle 10 may include a vehicle control unit (VCU) 152 that may communicate with electric power inverter 115, powertrain controller 116, friction or foundation caliper controller 170, global positioning system (GPS) 188, BMS controller 139, and dashboard 186 and components included therein via controller area network (CAN) 120. VCU 152 includes memory 114, which may include read-exclusive memory (ROM or non-transitory memory) and random access memory (RAM). VCU also includes a digital processor or central processing unit (CPU) 153, and inputs and outputs (I/O) 118 (e.g., digital inputs including counters, timers, and discrete inputs, digital outputs, analog inputs, and analog outputs). VCU may receive signals from sensors 154 and provide control signal outputs to actuators 156. Sensors 154 may include but are not restricted to lateral accelerometers, longitudinal accelerometers, yaw rate sensors, inclinometers, temperature sensors, battery voltage and current sensors, and other sensors described herein. Additionally, sensors 154 may include steering angle sensor 197, driver demand pedal position sensor 141, vehicle range finding sensors including radio detection and ranging (RADAR), light detection and ranging (LIDAR), sound navigation and ranging (SONAR), and caliper application pedal position sensor 151. Actuators may include but are not constrained to inverters, transmission controllers, display devices, human/machine interfaces, friction caliper systems, and battery controller described herein.

Driver demand pedal position sensor 141 is shown coupled to driver demand pedal 140 for determining a degree of application of driver demand pedal 140 by human 142. Caliper application pedal position sensor 151 is shown coupled to caliper application pedal 150 for determining a degree of application of caliper application pedal 150 by human 142. Steering angle sensor 197 is configured to determine a steering angle according to a position of steering wheel 198.

Vehicle propulsion system 199 is shown with a global position determining system 188 that receives timing and position data from one or more GPS satellites 189. Global positioning system may also include geographical maps in ROM for determining the position of vehicle 10 and features of roads that vehicle 10 may travel on.

Vehicle propulsion system 199 may also include a dashboard 186 that an operator of the vehicle may interact with. Dashboard 186 may include a display system 187 configured to display information to the vehicle operator. Display system 187 may comprise, as a non-restricting example, a touchscreen, or human machine interface (HMI), display which enables the vehicle operator to view graphical information as well as input commands. In some examples, display system 187 may be connected wirelessly to the internet (not shown) via VCU 152. As such, in some examples, the vehicle operator may communicate via display system 187 with an internet site or software application (app) and VCU 152.

Dashboard 186 may further include an operator interface 182 via which the vehicle operator may adjust the operating status of the vehicle. Specifically, the operator interface 182 may be configured to activate and/or deactivate operation of the vehicle driveline (e.g., propulsion source 105) based on an operator input. Further, an operator may request an axle mode (e.g., park, reverse, neutral, drive) via the operator interface. Various examples of the operator interface 182 may include interfaces that utilize a physical apparatus, such as a key, that may be inserted into the operator interface 182 to activate the vehicle propulsion system 199 including propulsion source 105 and to turn on the vehicle 10. The apparatus may be removed to shut down the transmission 135 and propulsion source 105 to turn off vehicle 10. Propulsion source 105 may be activated via supplying electric power to propulsion source 105 and/or electric power inverter 115. Propulsion source 105 may be deactivated by ceasing to supply electric power to propulsion source 105 and/or electric power inverter 115. Still other examples may additionally or optionally use a start/stop button that is manually pressed by the operator to start or shut down the propulsion source 105 to turn the vehicle on or off. In other examples, a remote electrified axle or electric machine start may be initiated remote computing device (not shown), for example a cellular telephone, or smartphone-based system where a user's cellular telephone sends data to a server and the server communicates with the vehicle control unit 152 to activate the inverter 115 and propulsion source 105. Spatial orientation of vehicle 10 is indicated via axes 175.

Vehicle 10 is also shown with a foundation or friction caliper controller 170. Friction caliper controller 170 may selectively apply and release friction calibers (e.g., 172*a* and 172*b*) via allowing hydraulic fluid to flow to the friction calipers. The friction calipers may be applied and released so as to reduce locking of the friction calipers to front wheels 102 and rear wheels 103. Wheel position or speed sensors 161 may provide wheel speed data to friction caliper controller 170. Vehicle propulsion system 199 may provide torque to rear wheels 103 to propel vehicle 10.

A human or autonomous driver 142 may request a driver demand wheel torque, or alternatively a driver demand wheel power, via applying driver demand pedal 140 or via supplying a driver demand wheel torque/power request to vehicle control unit 152. Vehicle control unit 152 may then demand a torque or power from propulsion source 105 via commanding powertrain controller 116. Powertrain controller 116 may command electric power inverter 115 to deliver the driver demand wheel torque/power via electrified axle 190 and propulsion source 105. Electric power inverter 115 may convert DC electrical power from battery 160 into AC power and supply the AC power to propulsion source 105. Propulsion source 105 rotates and transfers torque/power to transmission 135. Transmission 135 may supply torque from propulsion source 105 to differential gears 106, and differential gears 106 transfer torque from propulsion source 105 to rear wheels 103 via axle shafts 190*a* and 190*b*.

During conditions when the driver demand pedal is fully released, vehicle control unit 152 may request a small negative or regenerative power to gradually slow vehicle 10 when a speed of vehicle 10 is greater than a threshold speed. The amount of regenerative power requested may be a function of driver demand pedal position, battery state of charge (SOC), vehicle speed, and other conditions. If the driver demand pedal 140 is fully released and vehicle speed is less than a threshold speed, vehicle control unit 152 may request a small amount of positive torque/power (e.g., propulsion torque) from propulsion source 105, which may be referred to as creep torque or power. The creep torque or power may allow vehicle 10 to remain stationary when vehicle 10 is on a small positive grade.

The human or autonomous driver may also request a negative or regenerative driver demand slowing torque, or alternatively a driver demand slowing power, via applying caliper pedal 150 or via supplying a driver demand slowing power request to vehicle control unit 152. Vehicle control unit 152 may request that a first portion of the driver demanded slowing power be generated via propulsion source 105 via commanding powertrain controller 116. Additionally, vehicle control unit 152 may request that a portion of the driver demanded slowing power be provided via friction calipers 172*a* and 172*b* via commanding friction caliper controller 170 to provide a second portion of the driver requested slowing power.

After vehicle control unit 152 determines the slowing power request, vehicle control unit 152 may command powertrain controller 116 to deliver the portion of the driver demand slowing power allocated to propulsion source 105. Propulsion source 105 may convert the vehicle's kinetic energy into AC power.

Powertrain controller 116 includes predetermined transmission gear shift schedules whereby fixed ratio gears of transmission 135 may be selectively engaged and disengaged. Shift schedules stored in powertrain controller 116 may select gear shift points or events as a function of driver demand wheel torque and vehicle speed.

Turning now to FIG. 2, a stick diagram of transmission 135 is shown. In this example, transmission 135 is a step gear ratio transmission with two gear ratios (e.g., a first lower gear ratio 206 and a second higher gear ratio 204). In other examples, transmission 135 may include additional gear ratios.

Transmission 135 includes input shaft 202 for receiving mechanical torque from propulsion source 105. Propulsion source 105 is supplied with electric power via inverter 115 and a traction battery (not shown). Gear 250 and gear 254 are fixed to input shaft 202 and these gears rotate at a same speed as input shaft 202. Gear 250 is meshed with second idler gear 252 and gear 254 is meshed with first idler gear 256. Gear 250 and gear 252 along with gears 258 and 260 may form a second higher gear ratio (e.g., second gear). Gear 254 and gear 256 along with gears 258 and 260 may form a first lower gear ratio (e.g., first gear). Gears 252 and 256 may rotate freely about intermediate or layshaft 212 when dog clutch 210 is not engaged. A first tone wheel sensor 284 senses a position of first tone wheel 285, which rotates with gear 256. A second tone wheel sensor 282 senses a position of second tone wheel 283, which rotates with gear 252. A third tone wheel sensor 280 senses a position of third tone wheel 283, which rotates with intermediate shaft 212. Dog clutch 210 may selectively engage either gear 252 to engage the second higher gear or selectively engaged gear 256 to engage the first lower gear. Torque flow through transmission is interrupted when dog clutch 210 is not engaged to either of gears 252 and 256. A half of dog clutch 210 rotates with intermediate shaft so that when dog clutch 210 engages gear 252 via a second half of dog clutch 210, gear 252 rotates at a same speed as intermediate shaft 212. Likewise, dog clutch 210 may engage gear 256 via a second half of dog clutch 210 so that gear 256 rotates at a same speed as intermediate shaft 212. Intermediate shaft 212 rotates at a multiple of a rotational speed of output shaft 230. Intermediate shaft 212 includes gear 258 that meshes with gear 260 that is coupled to output shaft 230. Output shaft may rotate differential 106. Sleeve 295 of dog clutch 210 may be moved axially with respect to intermediate shaft 212 as indicated by arrow 255 via shift fork 214. Sleeve 295 may be moved to the left to engage gear 252 to intermediate shaft 212 and to the right to engage gear 256 to the intermediate shaft 212. Sleeve 295 rotates at a same speed as intermediate shaft 212. Shift fork 214 may be move axially via gear shifter actuator 220. Controller 116 may adjust a position of gear shifter actuator 220 via adjusting hydraulic valve 222 and hydraulic valve 224. A position of shift fork 214 and a position of dog clutch 210 may be determined via shift position sensor 216. The shift fork 214 and the shifter actuator are in the engaged position when shift fork 214 is at position 270 for gear 252 being engaged, or alternatively, at positon 271 for gear 256 being engaged. The locations of the position sensors for the transmission may be different than those shown in FIG. 2 without affecting operation and control of transmission 135.

The following may be applicable with reference the stick diagram depicted in FIG. 2 and considering the 2nd drive range engagement between sleeve 210 and gear 252 of FIG. 2. Considerations made for the 2nd drive range engagement may be easily extended to 1st drive range engagement, between gear 256 and the sleeve 210 (e.g., 408 of FIG. 4). Second tone wheel 283 rotates with gear 252 and it may include N (e.g., where N is an integer variable number) missing teeth. Second tone wheel 283 includes Z2-N teeth, where Z2 is an integer variable number. Third tone wheel 281 rotates with intermediate shaft 212. Third tone wheel 281 also includes N missing teeth and it has Z1-N teeth, where Z1 is an integer variable number. In this example, the actual total number of missing teeth for each tone wheel is the same, but in other examples, the number of missing teeth may be different for the different tone wheels. Additionally, in this example, Z1=Z2, but this may not be true in some examples such that the actual number of teeth for each wheel is different. The illustrated positioning of tone wheels allows a direct measurement on the components that are indexed (e.g., gears or shafts). Other options where angles are determined indirectly are also possible. For example, using a tone wheel fastened to input shaft 202 instead fixing the tone wheel to gear 252 and deriving angular positions for gear 252 by applying the ratio between gear 252 and gear 250. This may not the preferred solution as it may introduce errors due to mechanical backlash and clearances between the two gears. It may be appreciated that there is no obligation for a precise phasing/alignment between the teeth of tone wheel and the engaging teeth of the related dog clutch, the relative angular position may be left uncontrolled meaning that, for example, tone wheel 283 may be machined or mounted on gear 252 at a random angular position. This is a huge benefit as it implies a low production expense.

Figure 3B:
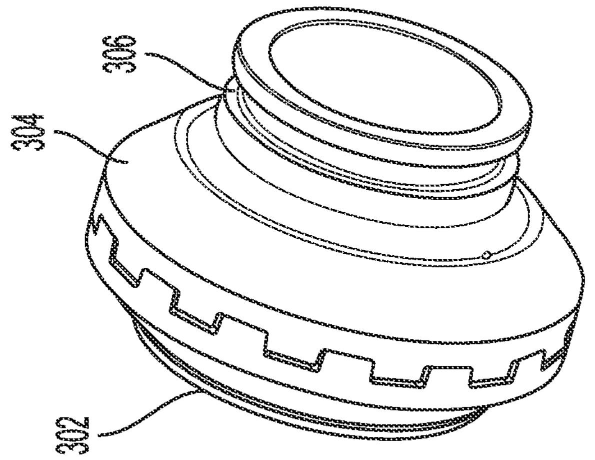
FIGS. 3A-5 show example dog clutches and dog clutch components.
Figure 3A:
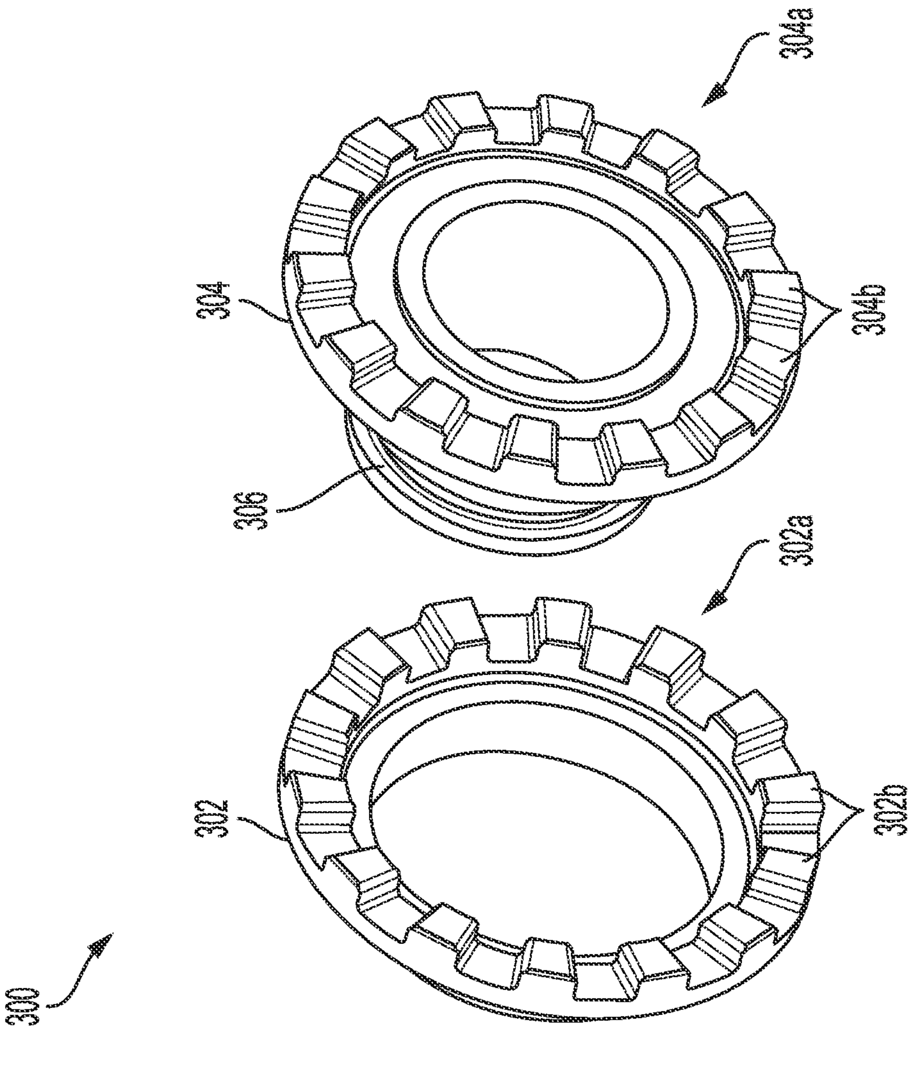

FIG. 3A shows a first example of a dog clutch 300. Dog clutch 300 includes a first side or half 302 and a second side or half 304. The first side 302 includes a first face 302*a*, and first face 302*a* includes teeth 302*b*. The second side 304 includes a second face 304*a*, and second face 304*a* includes teeth 304*b*. In this example, dog clutch 300 includes groove 306 by which a shift fork may engage the second half 304.

FIG. 3B shows a perspective view of dog clutch 300 in a closed position where the dog clutch is prepared to transfer torque between a shaft and a gear. First half 302 is shown engaged with second half 304. Groove 306 is more visible in this view than in the view shown in FIG. 3A.

Figure 4:
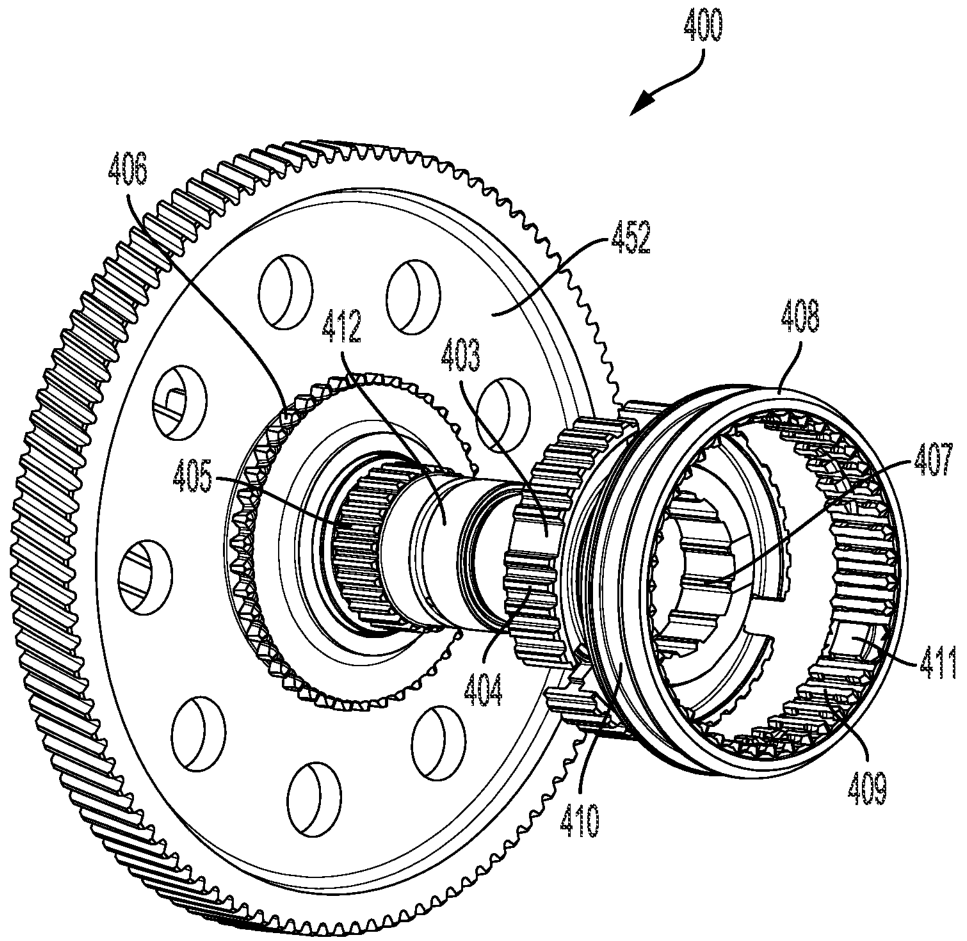

FIG. 4 shows a second example dog clutch 400 for vehicle propulsion system 199. In FIG. 4, a gear 452, which may be equivalent to gear 252 in FIG. 2, that may be selectively engaged by dog clutch 400 is shown. The second gear that may be engaged by dog clutch 400 is not shown for clarity.

Dog clutch 400 is a locking device that may selectively lock gear 452 to intermediate shaft 412, which may be equivalent to shaft 212 in FIG. 2, to engage a transmission gear (e.g., second gear). Gear 452 may freely rotate independent of the rotation of intermediate shaft 412 via needle bearing (not shown) that are between gear 452 and intermediate shaft 412. Hub 403 includes an inner spline 407 that is permanently mated with the spline 405 of gear 252 so that hub 403 is rotatably connected to shaft 412. Hub 403 is also axially fixed to shaft 412 via a couple of circlips (not shown). Sleeve 408 is rotatably connected to hub 403 by spline teeth pairs 404 and 409. Sleeve 408 may slide axially across hub 403. A fork (not shown) may drive axially sleeve 408 via grove 410. In this example, spline 406 may be part of a first half or side of the dog clutch 400 and spline 404 may be part of a second half or side of the dog clutch 400. When sleeve 408 is urged towards gear 452, spline teeth 409 couples with both splines 406 and 404, thereby rotatably connecting gear 452 and shaft 412. Spline 406 may be referred to as engagement ring or locking ring. Sleeve 408 may travel towards gear 452 up to a position where end-stop 411 reaches tip of spline 406. A control strategy may adjust a speed of gear 452 within a close range of a speed of shaft 412 so that dog clutch may be engaged with minimal interference of teeth. In a strategy, synchronization is the operation of matching rotational speed of hub 403, which may be imposed by vehicle speed, with rotational speed of spline 406, which may be controlled via the traction motor. This operation may be referred to as electrical synchronization. Often, sleeve 410 moving apart from gear 401 will approach a gear of another ratio passing through a neutral position. This second gear is not represented for the sake of clarity.

Either type of dog clutch shown in FIGS. 3A and 4 may be used as dog clutch 210 shown in FIG. 2. In other examples, dog clutch 210 may be a different design that is not shown herein without departing from the scope of a type of dog clutch that may be applied in the system and methods described herein.

Figure 5:
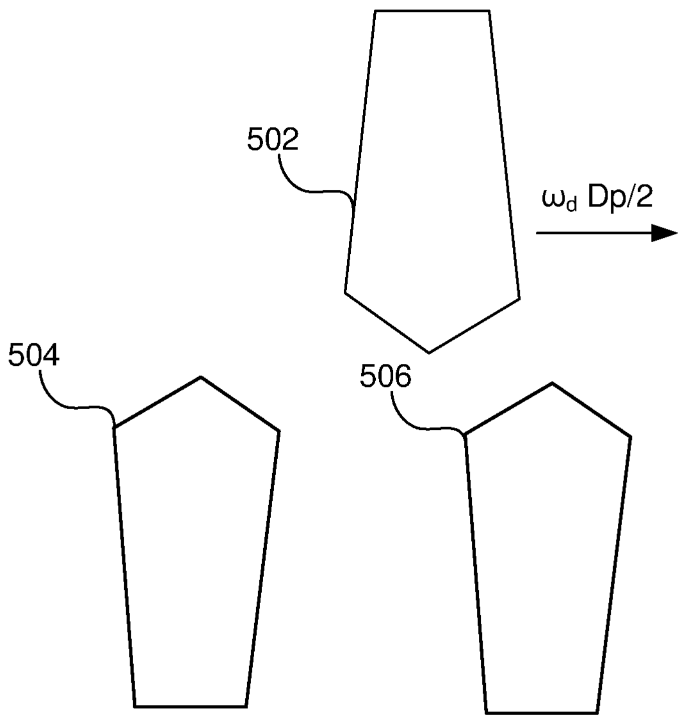

Referring now to FIG. 5, a plan view of example dog clutch teeth is shown. Tooth 502 is from the upper one the sleeve, whereas the teeth 504 and 506 are spline teeth (e.g., 406 of FIG. 4) from either of gear 252 or gear 256 of FIG. 2. The sleeve is spinning at the same speed of gear 258 in FIG. 2, and it ultimately gets its angular velocity from the vehicle wheels while the gears obtain their angular velocity from the electric motor. The difference of the two angular velocities is $\omega_d$ as seen and in a tangential direction the teeth of the dog clutch are moving with relative speed $\omega_d D_p/2$, where $D_p$ is the pitch diameter of the engagement ring spline. The sleeve may have a perpendicular motion (axial movement driven by a shift fork, top to bottom in FIG. 5) to engage the locking ring teeth.

The condition for engaging the dog ring is that the voids in one element and the teeth in the other element are aligned. Due to a residual small differential speed between the two elements of the dog clutch, the favorable condition to engage is intermittent, with time windows where the engagement is possible followed by time windows where it is impeded. The time windows length depends on differential speed and dog clutch design.

The exact matching of the teeth of one element to the cavities of the other is desirable to reduce interference between sleeve teeth and idler dog clutch teeth, but it is also desirable in case of flat teeth (face dog clutch). In examples where there is a face dog clutch, the interference may result in a missing engagement and, in case of electric actuation, a motor overload may occur resulting in higher currents and the possibility of motor degradation.

Interference between dog clutch teeth may generate noise during gear shifts in vehicle and increase dog clutch wear. The inventors herein have found that interference between dog clutch teeth may be reduced or prevented by knowing a relative position of teeth of one half of the dog clutch with respect to cavities of a second half of the dog clutch. Once this information is known, the control logic described herein may detect favorable time windows and produce a shift trigger event to finalize the engagement.

The system of FIGS. 1-5 provides for an electric propulsion system, comprising: an electric machine; a step gear ratio transmission including at least two gear ratios, the step gear ratio transmission including a shifter actuator; and one or more controllers including executable instructions that cause the one or more controllers to command the shifter actuator to engage a dog clutch in response to a phase angle being between two angles. In a first example, the electric propulsion system further comprises additional instructions that cause the controller to determine the phase angle via an angle of a first half of the dog clutch. In a second example that may include the first example, the electric propulsion system further comprises additional instructions that cause the controller to determine the phase angle via an angle of a second half of the dog clutch. In a third example that may include one or both of the first and second examples, the electric propulsion system includes where the two angles include a closing phase angle for a dog clutch minus angular backlash. In a fourth example that may include one or more of the first through third examples, the electric propulsion system includes where the two angles include the closing phase angle for the dog clutch plus angular backlash. In a fifth example that may include one or more of the first through fourth examples, the electric propulsion system further comprises additional instructions that cause the controller to add an offset angle to the phase angle and engage the dog clutch in response to the phase angle plus the offset angle being between the two angles. In a sixth example that may include one or more of the first through fifth examples, the electric propulsion system includes where the offset angle is based on an amount of time for the shifter actuator to move from its present position to an engaged position. In a seventh example that includes one or more of the first through sixth examples, the electric propulsion system further comprises additional executable instructions that cause the controller to synchronize a rotational speed of a gear to a rotational speed of an intermediate shaft before commanding the shifter to engage the dog clutch.

The system of FIGS. 1-5 also provides for an electric propulsion system, comprising: an electric machine; a step gear ratio transmission including at three tone wheels and three tone wheel position sensors, the step gear ratio transmission including a shifter actuator; and one or more controllers including executable instructions that cause the one or more controllers to adjust a position of the shifter actuator in response to a phase angle plus an offset angle. In a first example, the electric propulsion system includes where a first tone wheel of the three tone wheels is directly mechanically coupled to a first idler gear (e.g., mechanically coupled without intervening gears or clutches between the components). In a second example that may include the first example, the electric propulsion system includes where the second tone wheel of the three tone wheels is directly mechanically coupled to a second idle gear. In a third example that may include one or both of the first and second examples, the electric propulsion system includes where the third tone wheel of the three tone wheels is directly mechanically coupled to an intermediate shaft. In a fourth example that may include one or more of the first through third examples, the electric propulsion system includes where the position of the shifter actuator is an engaged position.

Turning now to FIG. 6, a flowchart of a method for measuring angles of a first half of a dog clutch that is mechanically coupled directly to a first tone wheel and a second half of a dog clutch that is mechanically coupled directly to a second tone wheel is shown. Alternatively, the method of FIG. 6 may determine angles of other rotating components that are mechanically coupled to the tone wheels since the tone wheels rotate with the rotating components (e.g., half or portion of a dog clutch, an idler gear, or an intermediate shaft). The angles for the dog clutch half may be for a dog clutch that is included in a transmission that is of the type shown in FIGS. 1 and 2. The method of FIG. 6 may be incorporated into and may cooperate with the system of FIGS. 1-5. Further, at least portions of the method of FIG. 6 may be incorporated as executable instructions stored in non-transitory memory of one or more controllers while other portions of the method may be performed via the one or more controllers transforming operating states of devices and actuators in the physical world. The first half of the dog clutch may rotate at a same speed as a first device (e.g., a gear such as 252 of FIG. 2) and the second half of the dog clutch may rotate at a same speed as a second device (e.g., an intermediate shaft).

Method 600 determines angles $\alpha 1$ and $\alpha 2$, corresponding to steps 702 and 704 of FIG. 7. It may be understood that while gear shifting, the vehicle travel direction remains the same. Method 600 may be performed with data from sensors 280 and 282 of FIG. 2 as well as with data from sensors 280 and 284 to determine the relative angles of gears 252 and 256.

At 602, method 600 monitors output of a tone wheel position sensor (e.g., 282 or 284) that is mechanically coupled directly or indirectly to a rotating component of interest (e.g., dog clutch half, idler gear, or intermediate shaft). Method 600 proceeds to 604.

At 604, method 600 judges whether or not if passage of a new tooth of a tone wheel has been detected since a last time that method 600 executed. If so, the answer is yes and method 600 proceeds to 606. Otherwise, the answer is no and method 600 proceeds to 620.

At 606, method 600 judges whether or not the new or most recently sensed tooth is a first tooth after a missing tooth on the wheel was most recently detected. If so, the answer is yes and method 600 proceeds to 608. Otherwise, the answer is no and method 600 proceeds to 610. In one example, a variable i is applied as a zero-based tooth counter where i=0 when a missing tooth of the tone wheel being monitored is missing. The value for i for the last tooth of the tone wheel before the location of the missing tooth on the tone wheel is: $i=Z-N-1$ where Z is a variable that represents the actual total number of teeth the tone wheel would have if it were not missing any teeth and N is a variable that represents an actual total number of teeth that are missing from the tone wheel. In the present example, N is a value of one, but greater numbers of missing teeth may be applied in some examples. Thus, if the value of i is greater than zero, the answer is yes and method 600 proceeds to 608. Otherwise, the answer is no and method 600 proceeds to 610.

At 608, method 600 increments the value of variable i by one such that i=i+1. Method 600 proceeds to 610.

At 610, method 600 updates or revises the angle of the tone wheel that is being monitored. By updating the angle of the tone wheel that is being monitored, the angle of the gear or shaft that the tone wheel is coupled to is also updated since these angles are equivalent. The angle of the tone wheel and the device that is mechanically coupled to is revised according to the equation:

$$\alpha = i \cdot 2n/Z$$

where $\alpha$ is the angle of the tone wheel and the device that is coupled to the tone wheel, i is the tooth count, and Z is as previously described. It may be noted that when the value of i=0, then $\propto=0$. Thus, the angle may be automatically reset to zero when a missing tooth is detected. Method 600 proceeds to 612.

Depending on the sign of the angular velocity of the tone wheel there are two possibilities for detecting first teeth. However, the angle between the two first teeth is known and it may be used as a simple offset once the sign of the angular speed is known. The sign can be assessed from the vehicle speed or the tone wheel sensor can detect the direction of the spinning tone wheel. The sign information may be nested in the duty cycle of a square wave that is generated from the tone wheel sensor signal. For the sake of simplicity, one tone wheel direction is considered in the methods of FIGS. 6 and 7.

At 612, method 600 updates the angular velocity of a tone wheel and the device that the tone wheel is mechanically coupled to or synchronous with. Method 600 may update the angular velocity of the tone wheel according to the following equation:

$$\omega = \frac{2\pi}{Z \cdot t}$$

where ω is the angular velocity of the tone wheel and the device that the tone wheel is mechanically coupled to as estimated via a forward Euler method, t is an amount of time since a most recent tooth passage by the position sensor was detected by the position sensor, and Z is as previously described. Method 600 proceeds to 614.

At 614, method 600 resets the value of the timer that tracks an amount of time between detection of adjacent teeth on the tone wheel to a value of zero (e.g., t=0). Method 600 proceeds to exit.

At 620, method 600 update a value t that is a measure of an amount of time since a tooth of the tone wheel being monitored was most recently detected. The amount of the value t may be updated based on a value of a timer of the controller. Method 600 proceeds to 622.

At 622, method 600 uses extrapolation to estimate the angle of the tone wheel with respect to the tone wheel's zero angle. In particular, method 600 assumes that the rotational speed of the tone wheel has not changed since a most recent tooth was detected as determined at step 612. The angular rotation since the last tooth was detected is determined as:

$$\Delta\alpha = \omega \cdot t$$

where Δα is the tone wheel angle change since the most recent tooth was detected, t is the amount of time since the last tooth was detected and ω is the angular velocity of the tone wheel the last time a tooth of the tone wheel was detected by the tone wheel sensor. The present angle of the tone wheel and the rotating device that the tone wheel is mechanically coupled to is determined by the following equation:

$$\alpha = i \cdot \frac{2\pi}{Z} + \omega \cdot t$$

where α is the present angle of the tone wheel and the device that the tone wheel is mechanically coupled to. The remaining variables are as previously described. Method 600 proceeds to 624.

At 624, method 600 performs a missing tooth evaluation. Since method 600 answered no at step 604, there may be two possibilities: 1. The tooth sensor is facing a cavity between two adjacent teeth, or 2. The tooth sensor is facing a missing tooth cavity. For a cavity between two adjacent teeth, a new tooth may be detected at an approximate time of Δα/ω. For the case being a missing tooth cavity, the next tooth may be detected at $$(N+1)\frac{\Delta\alpha}{\omega},$$

where N is the actual total number of missing teeth and where the other variables are as previously described. The missing tooth may also be predicted to be detected when one full rotation of the tone wheel has nearly occurred. The value of the variable i may be indicative of the location of the missing tooth. The missing tooth may be determined to be found when the following two conditions are present: 1. i=Z−N−m where m is a maximum expected number of undetected teeth in one revolution of the tone wheel; 2. Where the value of the timer t is greater than $$t^* = C\frac{\Delta\alpha}{\omega}$$

where t* is a maximum estimated time after which it is possible to reliably detect a missing tooth of the tone wheel, C is a tunable constant greater than 1 and lower than (N+1), and that considers possible variations in ω. Method 600 proceeds to 626.

At 626, method 600 judges whether or not a missing tooth of the tone wheel has been detected. If so, the answer is yes and method 600 proceeds to 628. Otherwise, the answer is no and method 600 proceeds to exit.

At 628, method 600 resets the value of i to zero (e.g., i=0).

For low values of ω, shifting gear ranges may not be plausible, so the angle α may be ignored.

Referring now to FIG. 7, a flowchart of a method for determining phase of tone wheel with respect to the position of a tone wheel of an intermediate shaft is shown. The method of FIG. 7 also may determine engagement of a dog clutch. The phase of the tone wheels and the devices that the tone wheels are mechanically coupled to may be type shown in FIGS. 1 and 2. The method of FIG. 7 may be incorporated into and may cooperate with the system of FIGS. 1-5 and the method of FIG. 6. Further, at least portions of the method of FIG. 7 may be incorporated as executable instructions stored in non-transitory memory of one or more controllers while other portions of the method may be performed via the one or more controllers transforming operating states of devices and actuators in the physical world.

At 702, method 700 determines an angular position of a first tone wheel (e.g., 285 of FIG. 2) as described in the method of FIG. 6. Similarly, method 700 determines an angular position of a second tone wheel (e.g., 281 of FIG. 2) as described in the method of FIG. 6. In another example, method 700 determines angular position of the first tone wheel (e.g., 283 of FIG. 2) and angular position of a second tone wheel (e.g., 281 of FIG. 2). Method 700 proceeds to 706.

At 706, method 700 determines a phase angle between the two tone wheel angles that were determined at 702. Since a tone wheel has Zd teeth, there are Zd relative possible engagement positions between the idler gear (e.g., 256 of FIG. 2, where 285 is the tone wheel that is mechanically coupled to the idler gear) and the sleeve (e.g., 295 of FIG. 2, where tone wheel 281 rotates at a same speed as intermediate shaft 212). In other words, if the phase angle Φ is the minimum phase angle between the two tone wheel gaps when the dog clutch is engaged, the engagement is also possible with a phase angle $\Phi+j*2\pi/Zd$, where j is an integer in the range of [1 Zd]. As such, the minimum phase angle Φ may be determined via a modulus operation: $\Phi=(\alpha1-\alpha2)$ mod Zd, where mod is a modulus operator that returns a remainder of division, where $(\alpha1-\alpha2)$ is the dividend and Zd is the divisor. Method 700 proceeds to 708.

At 708, method 700 judges whether or not the minimum phase angle Φ is constant to determine whether or not the dog clutch is engaged, thereby engaging a particular gear. Since each tone wheel is mechanically coupled to a related dog clutch engaging component, the relative angle between the tone wheels is equivalent to the relative angle between the engaging components of the dog clutch. Thus, there is no obligation to adjust phasing between tone wheel teeth and their related dog clutch component teeth. A particular idler gear is rotatably connected to the sleeve and intermediate shaft when the dog clutch is engaged in the gear ratio that includes the particular idler gear. Therefore, the idler gear and the sleeve have exactly a same speed and the minimum phase Φ is constant. As a result, the minimum phase angle together with the linear position of the shifter fork may be utilized to detect an engaged position.

Engagement of a particular gear may be determined when the minimum phase angle Φ is constant and the shifter fork position is greater than a threshold position. The minimum phase angle Φ may be determined to be constant via the minimum phase angle Φ not changing for a threshold amount of time. If method 700 judges that the gear is engaged by an engaged dog clutch, the answer is yes and method 700 proceeds to 710. Otherwise, the answer is no and method 700 proceeds to 712.

At 710, method 700 stores the minimum phase angle at which the dog clutch is engaged to controller memory as Φc. Method 700 proceeds to exit.

At 712, method 700 determines an error between present and target phases that is to be applied by shifting logic. Φc is the phase registered when the clutch is engaged. For a smooth reengagement it may be desirable to align the two half parts of the dog clutch so that the phase $\Phi$=mod $(\alpha1-\alpha2,Zd)$, is equal (or at least very close) to Φc. This corresponds to the voids of one half of the dog clutch being faced to the teeth of the other half of the dog clutch. The logic may also be applied using $(\alpha1-\alpha2)$ instead of the modulus; however, this is a more stringent embodiment as it adds an additional condition: not only the teeth and voids are aligned, but the absolute position between the teeth of the two parts should be the same as last engagement. For example, assume that when the dog clutch is first engaged, tooth number 3 of clutch of part A (e.g., first half or face of the dog clutch) is between number 9 and 10 of clutch part B (e.g., second half or face of the dog clutch). Qc and the clutch is disengaged. Using this condition with modulus, it is enough to have a proper alignment, and the next engagement could also result in tooth number 3 of clutch part A being between teeth 1 and 2 of clutch part B. Using absolute position $(\alpha1-\alpha2)$, the logic will try to put the tooth 3 again between teeth 9 and 10 of the other side of the dog clutch. Method 700 proceeds to exit.

Turning now to FIG. 8, a method for commanding a shifter of a dog clutch to engage is shown. The method of FIG. 8 may be incorporated into and may cooperate with the system of FIGS. 1-5 and the methods of FIGS. 6 and 7. Further, at least portions of the method of FIG. 8 may be incorporated as executable instructions stored in non-transitory memory of one or more controllers while other portions of the method may be performed via the one or more controllers transforming operating states of devices and actuators in the physical world.

At 802, method 800 determines a shifter actuator position and an amount of time it would take to move the shifter from its present position (e.g., a neutral position where the dog clutch does not engage a gear ratio) to an engaged position for the gear that is associated with an on-coming gear ratio (e.g., gear 252 for second higher gear ratio 204 of FIG. 2). In one example, the amount of time may be retrieved from a look-up table. In another example, the amount of time may be calculated by dividing the distance to be traveled for engagement of the dog clutch by the average actuator speed to travel the distance to engage the dog clutch. Method 800 proceeds to 804.

At 804, method 800 commands the electric machine to synchronize speed of a gear of the on-coming gear ratio (e.g., gear 252 for second higher gear ratio 204 of FIG. 2) with the speed of the intermediate shaft. Method 800 proceeds to 806.

At 806, method 800 judges whether or not the present phase angle Φ is less than or equal to $\Phi_c$+G or greater than or equal to $\Phi_c$−G, where G is an angular backlash amount and Φ and Pc are as previously described. If method 800 judges that the present phase angle Φ is less than or equal to $\Phi_c$+G or greater than or equal to $\Phi_c$−G, the answer is yes and method 800 commands the gear shifter to engage the dog clutch at 808. Otherwise, method 800 returns to 806.

In other examples, method 800 may judge whether or not the present phase angle Φ plus offset angle β is less than or equal to $\Phi_c$+G or greater than or equal to $\Phi_c$−G, where G is an angular backlash amount, β is an offset angle that is determined by the amount of time it takes to move the shifter actuator from its present position to its engaged position multiplied by the angular velocity of the speed difference between the gear being engaged and the intermediate shaft, and where Φ and Φc are as previously described. If method 800 judges that the present phase angle Φ+β is less than or equal to $\Phi_c$+G or greater than or equal to $\Phi_c$−G, the answer is yes and method 800 commands the gear shifter to engage the dog clutch at 808.

The methods of FIGS. 6-8 provide for a method for operating a vehicle, comprising: estimating a first angle of a first rotating device of a step gear ratio transmission; estimating a second angle of a second rotating device of the step gear ratio transmission; estimating a phase angle between the first angle and the second angle; and adjusting a position of a shifter actuator in response to the phase angle. In a first example, the method includes where the first angle is based on a position of a first tone wheel, and where the first tone wheel includes one or more adjacent missing teeth. In a second example that may include the first example, the method includes where the second angle is based on a position of a second tone wheel, and where the second tone wheel includes one or more adjacent missing teeth. In a third example that may include one or both of the first and second examples, the method includes where the phase angle is a difference between the first angle and the second angle. In a fourth example that may include one or more of the first through third examples, the method further comprises adding an offset angle to the phase angle and adjusting the position of the shifter actuator in response to the phase angle plus the offset angle. In a fifth example that may include one or more of the first through fourth examples, the method includes where the offset angle is based on an amount of time to move the shifter actuator from its present position to an engaged position. In a sixth example that may include one or more of the first through fifth examples, the method further comprises determining that a dog clutch is engaged based on the phase angle and the position of the shifter actuator.

Finally, FIG. 9 shows an example tone wheel 281 and tone wheel sensor 280 from FIG. 2. Tone wheel 281 includes a plurality of evenly spaced teeth 902 and a missing tooth as indicated. In one example, tone wheel sensor 280 may be a Hall effect sensor that outputs a signal as teeth 902 pass the tone wheel sensor 280.

Note that the example control and estimation routines included herein may be used with various powertrain and/or vehicle system configurations. The control methods and routines disclosed herein may be stored as executable instructions in non-transitory memory and may be carried out by the control system including the controller in combination with the various sensors, actuators, and other transmission and/or vehicle hardware. Further, portions of the methods may be physical actions taken in the real world to change a state of a device. Thus, the described actions, operations and/or functions may graphically represent code to be programmed into non-transitory memory of the computer readable storage medium in the vehicle and/or transmission control system. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. One or more of the method steps described herein may be omitted if desired.

While various embodiments have been described above, it is to be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology may be applied to electric vehicles and hybrid vehicles including induction and synchronous electric machines. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims may be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric propulsion system, comprising:

an electric machine;

a step gear ratio transmission including three tone wheels and three tone wheel position sensors, the step gear ratio transmission including a shifter actuator; and one or more controllers including executable instructions stored in memory that cause the one or more controllers to command the shifter actuator to engage a dog clutch in response to a phase angle between two tone wheel angles of the three tone wheels being less than or equal to a minimum phase angle plus an angular backlash amount or greater than or equal to the minimum phase angle minus the angular backlash amount, where the minimum phase angle is a phase angle between the two tone wheel angles at which the dog clutch is engaged, and where the angular backlash amount is an angular amount corresponding to clearance between teeth of a first half of the dog clutch and cavities of a second half of the dog clutch.

2. The electric propulsion system of claim 1, further comprising additional instructions that cause the one or more controllers to determine the phase angle via an angle of a first half of the dog clutch.

3. The electric propulsion system of claim 2, further comprising additional instructions that cause the one or more controllers to determine the phase angle via an angle of a second half of the dog clutch.

4. The electric propulsion system of claim 1, further comprising additional instructions that cause the one or more controllers to add an offset angle to the phase angle and engage the dog clutch in response to the phase angle plus the offset angle being between the minimum phase angle plus the angular backlash amount and the minimum phase angle minus the angular backlash amount, where the offset angle is an offset of the phase angle between the two tone wheel angles of the three tone wheels, and wherein the offset angle is determined by an amount of time for the shifter actuator to move from its present position to an engaged position.

5. The electric propulsion system of claim 1, further comprising additional executable instructions that cause the one or more controllers to synchronize a rotational speed of a gear to a rotational speed of an intermediate shaft before commanding the shifter actuator to engage the dog clutch.

6. An electric propulsion system, comprising:

an electric machine;

a step gear ratio transmission including three tone wheels and three tone wheel position sensors, the step gear ratio transmission including a shifter actuator; and one or more controllers including executable instructions stored in memory that cause the one or more controllers to adjust a position of the shifter actuator in response to a phase angle between two tone wheel angles of the three tone wheels plus an offset angle, wherein the offset angle is an offset of the phase angle between the two tone wheel angles of the three tone wheels, wherein the offset angle is determined by an amount of time for the shifter actuator to move from its present position to an engaged position, wherein the engaged position is a position of the shifter actuator at which a dog clutch of the step gear ration transmission engages a gear.

7. The electric propulsion system of claim 6, where a first tone wheel of the three tone wheels is directly mechanically coupled to a first idler gear.

8. The electric propulsion system of claim 7, where a second tone wheel of the three tone wheels is directly mechanically coupled to a second idler gear.

9. The electric propulsion system of claim 8, where a third tone wheel of the three tone wheels is directly mechanically coupled to an intermediate shaft.

10. The electric propulsion system of claim 6, where the position of the shifter actuator is the engaged position.

* * * * *